United States Patent [19]

Takagi et al.

[11] 4,025,174
[45] May 24, 1977

[54] CINECAMERA CAPABLE OF SYNCHRONOUS RECORDING

[75] Inventors: Katsuhide Takagi, Okaya; Toshiro Fukasawa, Nagano, both of Japan

[73] Assignee: Sankyo Kogaku Kogyo Kabushiki-Kaisha, Suwa, Japan

[22] Filed: May 5, 1975

[21] Appl. No.: 574,669

[30] Foreign Application Priority Data

May 8, 1974 Japan .................... 49-51893[U]

[52] U.S. Cl. .................. 352/72; 352/29; 352/174

[51] Int. Cl.² .................................. G03B 23/02

[58] Field of Search .............. 352/72, 27, 29, 174, 352/176, 177, 178

[56] References Cited

UNITED STATES PATENTS

| | | | |
|---|---|---|---|
| 3,106,126 | 10/1963 | Kirk | 352/178 |
| 3,511,948 | 5/1970 | Marvin | 352/178 |
| 3,880,504 | 4/1975 | Marvin | 352/72 X |

Primary Examiner—Monroe H. Hayes
Attorney, Agent, or Firm—Pollock, Vande Sande & Priddy

[57] ABSTRACT

The invention discloses a cinecamera capable of synchronous recording wherein a swingable arm carrying a pinch roller at one end thereof is operatively coupled to a shutter release locking lever in such a manner that when the lever is placed in the shutter release locking position for preventing shooting, the pinch roller may be moved away from a capstan by a sufficient distance to permit the smooth loading and unloading of a film cartridge, but when the lever is switched to the release position for permitting the shooting the arm may be swung to displace the pinch roller to a position very closely spaced from the capstan. The construction of the cinecamera may be remarkably simplified as compared with the conventional cinecameras wherein the pinch roller arm is operatively coupled to the cover or lid of the camera.

5 Claims, 6 Drawing Figures

CINECAMERA CAPABLE OF SYNCHRONOUS RECORDING

BACKGROUND OF THE INVENTION

The present invention relates to generally a cinecamera capable of magnetic recording simultaneously with shooting on the magnetic track of a film (hereinafter referred to as synchronous recording in this specification).

In conventional cinecameras capable of sychronous recording, a capstan and a recording head of a magnetic recording device are disposed within a film cartridge chamber, and an arm carrying a pinch roller and a film pressing pad which cooperate with the capstan and the head, respectively, (which arm will be referred to as a pinch roller arm hereinafter in this specification) is swingably mounted within the camera body. When the film cartridge is loaded, or unloaded the pinch roller arm is so actuated as to move the pinch roller away from the capstan by a sufficient distance so as to permit the smooth loading or unloading of the film cartridge, but when the lid or cover is closed after the film cartridge has been loaded, the pinch roller arm is so actuated, in cooperative relation with the closing operation of the lid or cover, as to bring the pinch roller to a position very closely spaced apart from the capstan. In this position, the pinch roller is prevented from pressing the film against the capstan because if the pinch roller is kept pressed against the capstan for a long time with the film interposed therebetween, permanent distortion of the contact surfaces would be produced, thus resulting in unsatisfactory recording. When a shutter release button is depressed to start the shooting, the pinch roller arm is further actuated to cause the pinch roller and the pad to press the film against the capstan and the head, respectively. The film is transported at a predetermined constant speed, and the synchronous recording is started.

As described above, in the conventional cinecameras capable of synchronous recording, in general, the pinch roller is moved away from the capstan when the lid or cover of the camera is opened, and the pinch roller is moved to position very closely spaced apart from the capstan when the lid or cover is closed. In view of the operation of the cinecamera, the above arrangement is very advantageous in principle, but in practice the construction is very complex. The location of the linkage interconnecting the pinch roller arm and the lid or cover of the camera is limited, and the construction and arrangement of the other elements which are associated with the pinch roller arm to accomplish other functions in response to the movement of the pinch roller arm are also very complex.

SUMMARY OF THE INVENTION

One of the objects of the present invention is therefore to provide a cinecamera capable of synchronous recording in which the pinch roller arm is not operatively connected to the cover or lid of the camera and whose construction is very simple compared with conventional cinecameras capable of synchronous recording.

Briefly stated, according to the present invention, the pinch roller arm is operatively coupled to the shutter release locking lever as opposed to the conventional arrangement in which the pinch roller arm is operatively coupled to the lid or cover of the camera. When the locking lever is placed in the shutter release button locking position to prevent shooting, the pinch roller arm is so actuated as to move the pinch roller away from the capstan, but when the locking lever is placed in the release position to permit shooting, the pinch roller arm is so actuated as to move the pinch roller to a position very closely spaced from the capstan so that the pinch roller may press the film against the capstan immediately when the shutter release button is depressed.

DESCRIPTION OF THE PREFERRED EMBODIMENTS

Figure 1:
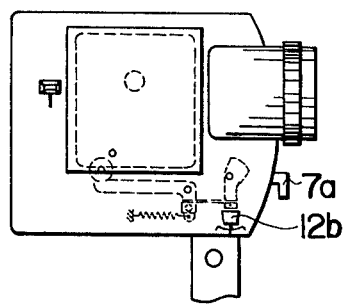
FIG. 1 is a schematic side view of a cinecamera capable of synchronous recording incorporating a first embodiment of the present invention.
Figure 2:
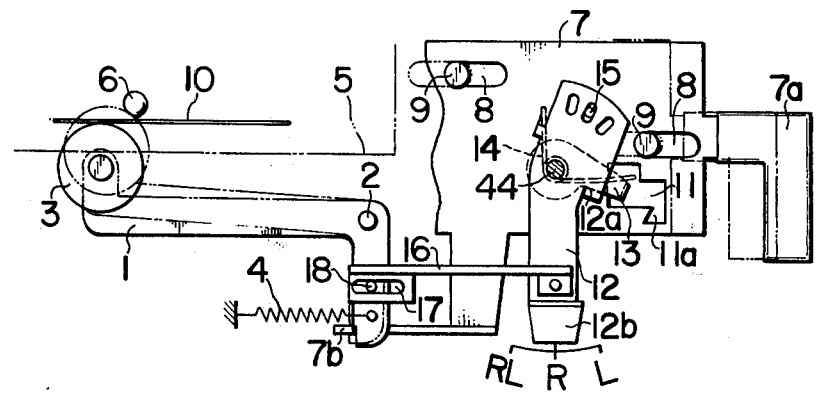
FIG. 2 is a side view of various elements of the first embodiment with a locking lever placed at the release position.
Figure 3:
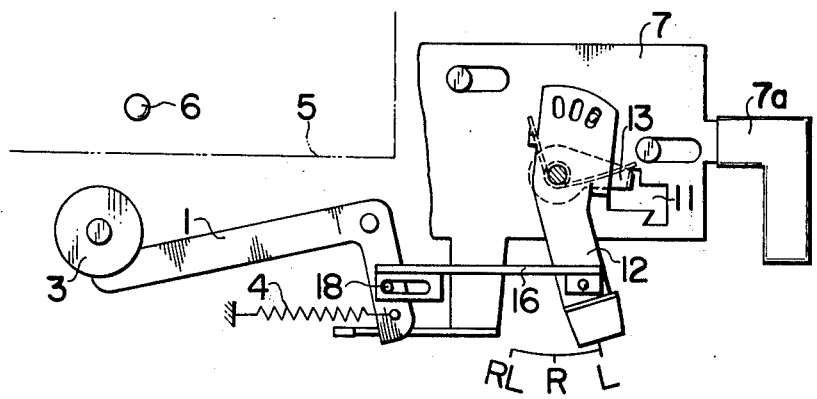
FIG. 3 is a view similar to FIG. 2, but illustrates the locking lever in the locking position.

First Embodiment, FIGS. 1-3

FIG. 2 shows various elements associated with the present invention and enclosed in the space of a cinecamera enclosed by the broken lines shown in FIG. 1. A pinch roller arm 1 carrying a pinch roller 3 at its one end is pivoted with a pivot pin 2 to the camera body, and is normally biased under the force of a spring 4 to rotate in a clockwise direction so that the pinch roller 3 may have a tendency to move toward and be pressed against a capstan 6 disposed within a film cartridge chamber 5 in the camera. A pinch roller actuating plate 7 which is formed integrally with a shutter release button 7a extending out of the camera body as shown in FIG. 1 is provided with two parallel guide slots 8 into which are fitted guide pins 9 extending from the camera body so that the displacement in the horizontal direction of the pinch roller actuating plate 7 is limited to a predetermined length. The actuating plate 7 is normally biased under the force of a spring (not shown) to move to the right in FIG. 2. An upright engaging portion 7b of the actuating plate 7 engages with the other end of the pinch roller arm 1 so that the pinch roller 3 may be held in a position very closely spaced from the capstan 6 with a film 10 interposed therebetween in a film guide groove (not shown) in the bottom of the film cartridge (not shown). The actuating plate 7 is further provided with a control slot or aperture 11 with a lower engaging portion 11a for the purpose to be described in detail hereinafter.

In the instant embodiment, when a locking lever 12 is displaced to the locking position L as shown in FIG. 3, the shutter release button 7a is locked so that one cannot depress it to start shooting; when the locking lever 12 is switched to the release position R shown in FIG. 2, the shutter release button 7a is released so that one may depress it to start shooting; and when the locking lever 12 is switched to the release locked position RL, the shooting can be continuous even when the shutter release button 7a is not kept depressed as will be described in more detail hereinafter.

The locking lever 12 and an engaging arm 13, which is interposed between the locking lever 12 and the actuating plate 7, are pivoted with a common pivot 44 to a stationary member (not shown) which is disposed on the side of the locking lever 12 and spaced apart from the actuating plate 7 by a suitable distance in parallel therewith. A spring 14 is loaded between the locking lever 12 and the engaging arm 13 in such a way that one side of the engaging arm 13 may be normally pressed against an upright engaging portion 12a of the locking lever 12 and that the engaging arm 13 may be rotated in unison with the locking lever 12. The lower end 12b of the locking lever 12 is bent in the form of an inverted L and extends out of the camera body as shown in FIG. 1 to serve as an operating knob.

On the camera body are marked three index markings L, R and RL as shown in FIG. 2 so that one may selectively align the operating knob 12b with one of the three index markings. The upper arm of the locking lever 12 is provided with three radial slots, and a steel ball 15 whose diameter is slightly larger than the width of the radial slots and which is loaded with a spring (not shown) is fitted into one of the three radial slots so that the locking lever 12 may be temporarily retained in the RL, R or L position.

The free end of the engaging arm 13 is bent at a right angle toward the back of the paper and is inserted into the control slot 11. One end of a connecting lever 16 is pivoted to the lower arm of the locking lever 12 and an elongated slot 17 formed at the other end of the connecting lever 16 is fitted with a guide pin 18 extended from the pinch roller arm 1.

Next the mode of operation of the first embodiment with the above construction will be described.

Lock, FIG. 3

When one places the operating knob 12b in the lock position L as shown in FIG. 3, the free end of the engaging arm 13 engages an upper engaging portion of the control slot 11 of the actuating plate 7 to lock the latter so that the shutter release button 7a cannot be depressed; that is, the button 7a cannot be displaced to the left in FIG. 3. Therefore, the film driving mechanism as well as the shutter mechanism (neither is shown) of the cinecamera are not energized. Since the locking lever 12 is swung to its most counterclockwise direction when knob 126 is placed in the lock position, the connecting lever 16 is displaced to the right to pull the pin 18 so that the pinch roller arm 1 is rotated about the pivot pin 2 in the counterclockwise direction. As a result, the pinch roller 3 at the other end of the arm 1 is moved away from the capstan 6. Under these conditions, one can unload the used cartridge and can load a new cartridge.

Release, FIG. 2

After having loaded a new cartridge, one switches the operating knob 12b to the release position R as shown in FIG. 2. The locking lever 12 swings in the clockwise direction to displace the connecting lever 16 to the left so that the pinch roller arm 1 is permitted to rotate in the clockwise direction under the force of the spring 4 until the other end of the arm 1 engages the upright engaging portion 7b of the actuating plate 7. Therefore the pinch roller 3 is moved to the position indicated by the solid line and closely spaced from the capstan. The free end of the engaging arm 13 is released from the upper engaging portion of the control slot 11 so that the shutter release button 7a may be depressed. When the button 7a is depressed to the position indicated by the broken lines in FIG. 2, the engaging portion 7b is displaced to the left so that the pinch roller arm 1 may be permitted to further rotate in the clockwise direction under the force of the spring 4. Therefore, the pinch roller 3 is pressed against the capstan 6 with the film 10 interposed therebetween so that the film 10 may be transported at a predetermined speed. The shooting is started and the sound is recorded upon the magnetic track on the film 10 by a magnetic recording device (not shown).

Release Locked

When one switches the operating knob 12b from the release position R to the release locked position RL, the spring 14 is energized, and when in such a state, the shutter release button 7a is depressed the free end of the engaging arm 13 drops into the lower engaging portion 11a so that the displacement to the right of the actuating plate 7 under the force of the spring (not shown) is prevented even when one releases the shutter button 7a. Therefore shooting with synchronous recording may be continuously carried out.

When one switches the operating knob 12b to the locking position L, all of the elements are returned to the initial position as shown in FIG. 3, so that one may unload the used film cartridge.

Figure 4:
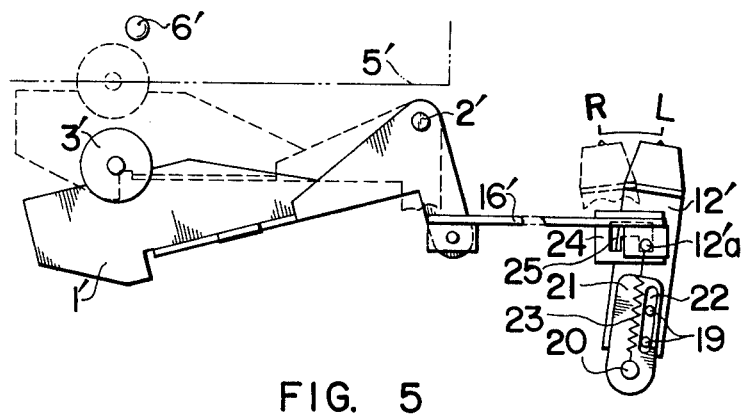
FIG. 4 is a side view of a second embodiment of the present invention.
Figure 5:
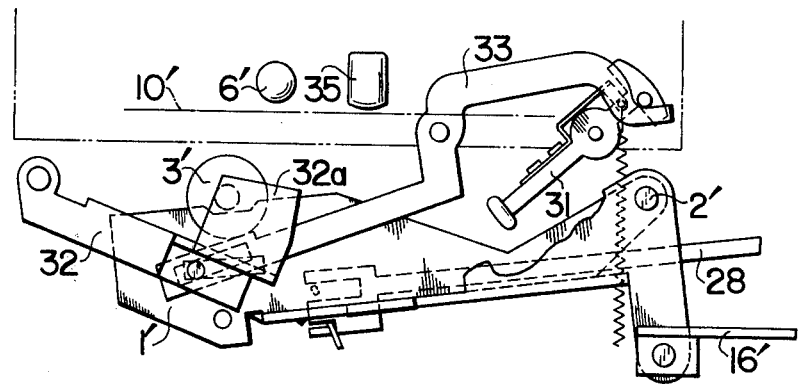
FIGS. 5 and 6 are views used for the explanation of the mode of operation thereof.
Figure 6:
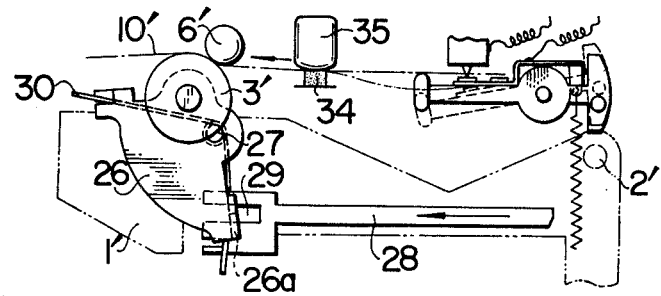

Second Embodiment, FIGS. 4–6

In the first embodiment, the shaft of the pinch roller 3 has been described as being directly attached to arm 1, but in some types of the cinecamera capable of synchronous recording, the shaft of the pinch roller is elastically attached to the arm so that the shaft may be displaced relative to the arm as will be described hereinafter with reference to FIGS. 4, 5 and 6.

Referring to FIG. 4, a lever 12', which corresponds to the locking lever 12 of the first embodiment, has pins 19 fitted into an elongated guide slot 22 formed in a swinging arm 21 pivoted at its one end to a stationary member (not shown). Therefore, the lever 12' may move upwardly and downwardly along the guide slot 22, but a compression spring 23 is loaded between the pivot pin 20 and a pin 12a' extended from the lever 12' so that the latter is normally biased downwardly. The pin 12a' is slidably fitted into an inverted U-shaped guide slot 25 formed in a stationary plate 24, and is also fitted into a hole at one end of a connecting lever 16'. The other end of the connecting lever 16' is pivoted to one end of a pinch roller arm 1' pivoted with a pivot pin 2' to the camera body.

Even though not shown in FIG. 4 for simplicity, to the back of the pinch roller arm 1' is pivoted with a pivot pin 27 a segment plate 26 for relative rotation with respect to the arm 1'. An engaging portion 26a bent at a right angle in the direction of the back of the paper at one side of the segment plate 26 is loosely fitted into the space between the prongs of a bifurcated end 29 formed at one end of a connecting lever 28 operatively coupled to a shutter release button (not shown). A spring 30 is loosely fitted over the pivot pin 27 and has its both ends engaged with spring stops formed at the free ends of the segment plate 26 and the connecting lever 28 in such a way that it will not produce any spring force unless an external force is exerted thereto. The shaft of a pinch roller 3' is attached to the segment plate 26 eccentrically of the center of rotation thereof.

In addition to the elements described above, on the camera body are attached a lever 31 (See FIG. 5) for automatically controlling the transport speed of the film by detecting slack of the loop of the film; a rocking arm 32 having attached thereto one end thereof a plate 32a for preventing vibration of the film cartridge in case of recording; and a lever 33 interconnected between lever 31 and rocking lever 32 so as to move them to or retract from predetermined positions in response to the rotation of pinch roller arm 1'. Since these elements do not constitute the present invention, no further description thereof shall not be made in this specification.

Next, the mode of operation of the second embodiment with the above construction will be described. When one places the lever 12' in the locking position L, the connecting lever 16' is displaced to the right to rotate the arm 1' in the counterclockwise direction about the pivot pin 2' so that the pinch roller 3' is sufficiently moved away from the capstan 6' as indicated by the solid lines in FIG. 4. After one has unloaded the used film cartridge and loaded a new cartridge, one pulls the lever 12' upwardly, displaces it to the left to the position R, and releases it. Then the lever 12' is returned to its lowered position under the force of the spring 23, but the pin 12a' drops into the left slot of the inverted U-shaped slot 25. Concurrently with the above operation, the connecting lever 16' is displaced to the left to rotate the arm 1' to the position indicated by the broken lines in FIG. 4. Therefore, the pinch roller 3' carried by the segment plate 26 is moved to a position closely spaced from the capstan 6'.

When one depresses the shutter release button (not shown) which is coupled operatively to the connecting lever 28, the latter is displaced to the left as indicated by the arrow in FIG. 6 to press against spring 30. As a result, the segment plate 26 is caused to rotate about the pin 27 in the clockwise direction so that the pinch roller 3' may be elastically pressed against the capstan 6' with the film 10' interposed therebetween. Thus, the film 10' may be transported at a predetermined speed. Concurrently with the above operation, a pad 34 carried by the arm 1' presses the film 10' against a magnetic head 35 on the side of the camera body so that synchronous recording may be started. When the lever 12' is pulled upward and displaced back to the position L, all of the elements are returned to the positions indicated by the solid lines in FIG. 4 so that one may unload the used cartridge.

As described hereinbefore, according to the present invention, the pinch roller arm is operatively coupled to the shutter release locking lever so that there is a distinct advantage in that cinecameras incorporating the present invention may be made remarkably simple in construction compared with conventional cinecameras of the type in which the pinch roller arm is operatively coupled to the cover or lid of the cinecamera.

What we claim is:

1. A cinecamera for simultaneous recording of sound and image on a film comprising:
   a film capstan,
   an L-shaped swingable arm supporting a pinch roller at one end thereof and pivotable about a pivot at the junction of its legs,
   a shutter release lever operable between a first normal position and a second operative position in which a filming operation can occur,
   a pivoted locking lever selectively operable between at least a first locking position and a second release position,
   means controlled by said locking lever to permit operation of said shutter release lever only when said locking lever is in its said release position,
   and further means comprising a connecting lever operatively connected between said locking lever and one leg of said swingable arm to swing said arm about its pivot, said further means being controlled by said locking lever to actuate said swingable lever to a first position in which said pinch roller is moved away from said capstan by a sufficient distance to facilitate the loading and unloading of a film cartridge from the camera when said locking lever is in its said first locking position, said further means also actuating said swingable lever to a second position in which said pinch roller is moved to a position closely adjacent said capstan when said locking lever is in its said second release position.

2. The cinecamera of claim 1 wherein said one leg of said swingable arm supports a projecting pin, said connecting lever defining therein an elongate slot for slidably receiving said pin, and spring means for rotationally urging said swingable arm to a position in which said pinch roller has moved away from said capstan.

3. A cinecamera for simultaneous recording of sound and image on a film comprising:
   a film capstan,
   a swingable arm supporting a pinch roller at one end thereof,
   a shutter release lever operable between a first normal position and a second operative position in which a filming operation can occur,
   a locking lever rotatable about a pivot and being selectively operable between at least a first locking position and a second release position,
   means for permitting movement of said locking lever radially relative to said pivot in opposition to the restoring force of a spring,
   a projecting arm on said locking lever,
   a stationary plate defining therein a slot of inverted U-shape for slidably receiving therein said pin,
   a connecting lever operatively connected between said locking lever and said swingable arm,
   means controlled by said locking lever to permit operation of said shutter release lever only when said locking lever is in its said second release position,
   and further means controlled by said locking lever for controlling said swingable lever to a first position in which said pinch roller is moved away from said capstan by a sufficient distance to facilitate the loading and unloading of a film cartridge from the camera when said locking lever is in its said first locking position, said further means also controlling said swingable lever to a second position in which said pinch roller is moved to a position closely adjacent said capstan when said locking lever is in its said second release position.

4. A cinecamera for simultaneous recording of sound and image on a film comprising:
   a film capstan,
   a swingable arm supporting a pinch roller at one end thereof, a shutter release lever operable between a first normal position and a second operative position in which a filming operation can occur, a locking lever selectively operable between at least a first locking position and a second release position, means controlled by said locking lever to permit operation of said shutter release lever only when said locking lever is in its said second release position, and further means controlled by said locking lever for controlling said swingable lever to a first position in which said pinch roller is moved away from said capstan by a sufficient distance to facilitate the loading and unloading of a film cartridge from the camera when said locking lever is in its said first locking position, said further means also controlling said swingable lever to a second position in which said pinch roller is moved to a position closely adjacent said capstan when said locking lever is in its said second release position, and additional means controlled by said shutter release lever and effective after said further means has moved said swingable arm to said second position to move said pinch roller into a position wherein the film is urged against said capstan, said additional means including a segment plate pivotally mounted on said swingable arm, a connecting lever controlled by said shutter release lever for pivoting said segment plate, said pinch roller being eccentrically mounted on said segment plate, and spring means acting on said segment plate to pivot said plate to a position in which said pinch roller pressure against said capstan is relieved.

5. A cinecamera for simultaneous recording of sound and image on a film comprising:

a film capstan, a swingable arm supporting a pinch roller at one end thereof, a shutter release lever operable between a first normal position and a second operative position in which a filming operation can occur, a locking lever selectively operable between at least a first locking position and a second release position, means controlled by said locking lever to permit operation of said shutter release lever only when said locking lever is in its said second release position, and further means controlled by said locking lever for controlling said swingable lever to a first position in which said pinch roller is moved away from said capstan by a sufficient distance to facilitate the loading and unloading of a film cartridge from the camera when said locking lever is in its said first locking position, said further means also controlling said swingable lever to a second position in which said pinch roller is moved to a position closely adjacent said capstan when said locking lever is in its said second release position, a pivoted lever responsive to the slack in the film, a rocking arm supporting a plate means for preventing vibration of the film cartridge, and a lever connected between said last-named pivoted lever and said rocking arm and operated in response to movement of said swingable arm.

* * * * *